United States Patent
Li et al.

(10) Patent No.: US 9,298,621 B2
(45) Date of Patent: Mar. 29, 2016

(54) MANAGING CHIP MULTI-PROCESSORS THROUGH VIRTUAL DOMAINS

(75) Inventors: Sheng Li, Mishawaka, IN (US); Norman Paul Jouppi, Palo Alto, CA (US); Naveen Muralimanohar, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 284 days.

(21) Appl. No.: 13/288,996

(22) Filed: Nov. 4, 2011

(65) Prior Publication Data

US 2013/0117521 A1    May 9, 2013

(51) Int. Cl.
| | |
|---|---|
| *G06F 12/10* | (2006.01) |
| *G06F 12/08* | (2006.01) |
| *G06F 15/173* | (2006.01) |
| *G06F 9/50* | (2006.01) |
| *G06F 12/02* | (2006.01) |
| *G06F 12/00* | (2006.01) |

(52) U.S. Cl.
CPC .......... *G06F 12/0813* (2013.01); *G06F 9/5077* (2013.01); *G06F 12/0817* (2013.01); *G06F 12/10* (2013.01); *G06F 12/1045* (2013.01); *G06F 15/17381* (2013.01); *G06F 2212/2542* (2013.01)

(58) Field of Classification Search
None
See application file for complete search history.

(56) References Cited

U.S. PATENT DOCUMENTS

| | | | |
|---|---|---|---|
| 7,398,380 B1 | 7/2008 | Lovett et al. | |
| 7,650,488 B2 | 1/2010 | Foong et al. | |
| 7,853,754 B1 * | 12/2010 | Agarwal et al. | 711/141 |
| 8,327,187 B1 * | 12/2012 | Metcalf | 714/10 |
| 2003/0023831 A1 * | 1/2003 | Deveruex | 712/34 |
| 2004/0221121 A1 * | 11/2004 | Hamilton et al. | 711/170 |
| 2005/0076179 A1 | 4/2005 | Schopp | |
| 2008/0282256 A1 * | 11/2008 | Misra | 719/312 |
| 2011/0153946 A1 * | 6/2011 | Solihin | 711/124 |
| 2011/0161346 A1 * | 6/2011 | Solihin | 707/769 |
| 2012/0173819 A1 * | 7/2012 | Solihin | 711/119 |

OTHER PUBLICATIONS

Liu, Fang et al, "Understanding How Off-Chip Memory Bandwidth Partitioning in Chip Multiprocessors Affects System Performance".
Srikantaiah et al, "SRP: Symbiotic Resource Partitioning of the Memory Hierarchy in CMPS", V. 5952, Pub Date 2010, pp. 277-291.

* cited by examiner

*Primary Examiner* — Tuan Thai
*Assistant Examiner* — Gautam Sain
(74) *Attorney, Agent, or Firm* — Hewlett Packard Enterprise Department

(57) ABSTRACT

A chip multi-processor (CMP) with virtual domain management. The CMP has a plurality of tiles each including a core and a cache, a mapping storage, a plurality of memory controllers, a communication bus interconnecting the tiles and the memory controllers, and machine-executable instructions. The tiles and memory controllers are responsive to the instructions to group the tiles into a plurality of virtual domains, each virtual domain associated with at least one memory controller, and to store a mapping unique to each virtual domain in the mapping storage.

19 Claims, 8 Drawing Sheets

MANAGING CHIP MULTI-PROCESSORS THROUGH VIRTUAL DOMAINS

BACKGROUND

A chip multi-processor (CMP) is a single integrated circuit (chip) having several tiles and one or more memory controllers. Each tile includes a core, one or more caches, and a router. Some CMPs have 256 or more tiles. The core typically contains an arithmetic logic unit or other circuits that can respond to machine instructions to perform logical, arithmetic, or other computer operations. The cache may include a private cache and lower-level caches. The last level cache can be private or shared through aggregation. The router handles communications. Data (including machine instructions and information such as numbers and text on which the instructions operate) can be retrieved from the cache much more quickly than from system memory. Initially, data resides in some form of non-volatile storage such as a hard disk. When an application is to be run, data pertaining to that application is transferred from storage into system memory. From there, items of data are copied into cache as the items are needed. Ideally, those items that are used most often are the ones in the cache. An application "sees" an item as having an address that is referred to as a virtual address. A page table in memory correlates virtual addresses as seen by an application with physical memory addresses, including auxiliary bits to aid the correlation. Portions of the page table may be copied into a translation lookaside buffer (TLB) for rapid access. Directory hardware keeps track of the physical addresses of items that have been copied into cache. The directory hardware can be distributed amongst the tiles to reduce overhead. When an application running in a tile requests an item having a certain virtual address, the TLB is consulted to find the corresponding physical address. The tile checks its local private cache (the private cache may have one or several levels), and if the item is not there or if the private cache does not have appropriate permissions, then the directory hardware is consulted to determine whether the requested item has been copied into cache. If so, the directory hardware identifies that tile having the cache which contains the copy of the requested item. Then the physical address is used to look up the item in that cache.

DRAWINGS

The drawings illustrate by example implementations of the invention.

FIGS. 1A, 1B, and 1C provide a flowchart illustrating an example method of managing a CMP through virtual domains.

DETAILED DESCRIPTION

Figure 1A:
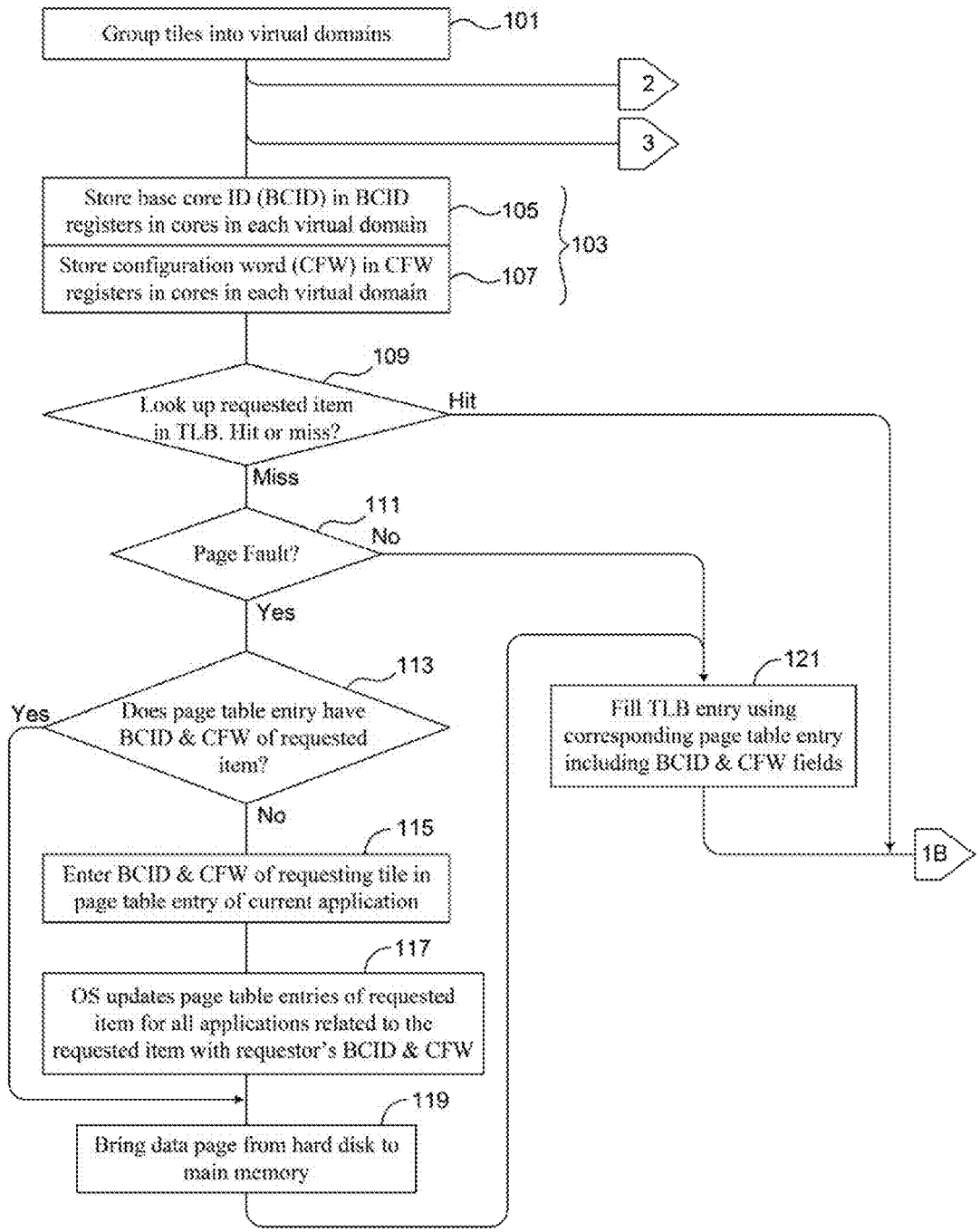

In the drawings and in this description, examples and details are used to illustrate principles of the invention. Other configurations may suggest themselves. Some known methods and structures have not been described in detail in order to avoid obscuring the invention. Methods defined by the claims may comprise steps in addition to those listed, and, except as indicated in the claims themselves, the steps may be performed in another order than that given. The systems and methods described herein may be implemented in various forms of hardware, software, firmware, special purpose processors, or a combination thereof. At least a portion of the invention may be implemented as an application comprising program instructions that are tangibly embodied on one or more program storage devices such as hard disks, magnetic floppy disks, RAM, ROM, and CDROM, and executable by any device or machine comprising suitable architecture. Some or all of the instructions may be remotely stored and accessed through a communication facility. Some of the constituent system components and process steps may be implemented in software, and therefore the connections between system modules or the logic flow of method steps may differ depending on the manner in which embodiments are programmed. Accordingly, the invention may be practiced without limitation to the details and arrangements as described. The invention is to be limited only by the claims, not by the drawings or this description.

As discussed above, each tile in a CMP has one or more caches. If an application running in a certain tile requests an item of data, and the directory hardware identifies a tile as having a cache that contains the latest copy of the item, the item is retrieved from the cache rather than from the system memory. If the tile from which the request originates already has that item in its own cache, this process is very fast. But if the request is directed to an item that is in another tile's cache, there is a delay while the item is retrieved. In an existing CMP, such a delay can be significant because the message requesting the item may have to travel from one end of the chip to the other just to determine where the item is stored, and if the item is actually stored in a cache that is physically close to the requesting tile, another message has to be sent back across the chip to actually transfer the item. This is called message indirection and results in a significant loss of processing speed. Processing speed can also be adversely impacted by inefficient allocation of memory pages and system resources. To meet increasing demands for speed and efficiency, there is a need for faster and more efficient processing in CMPs.

Figure 1B:
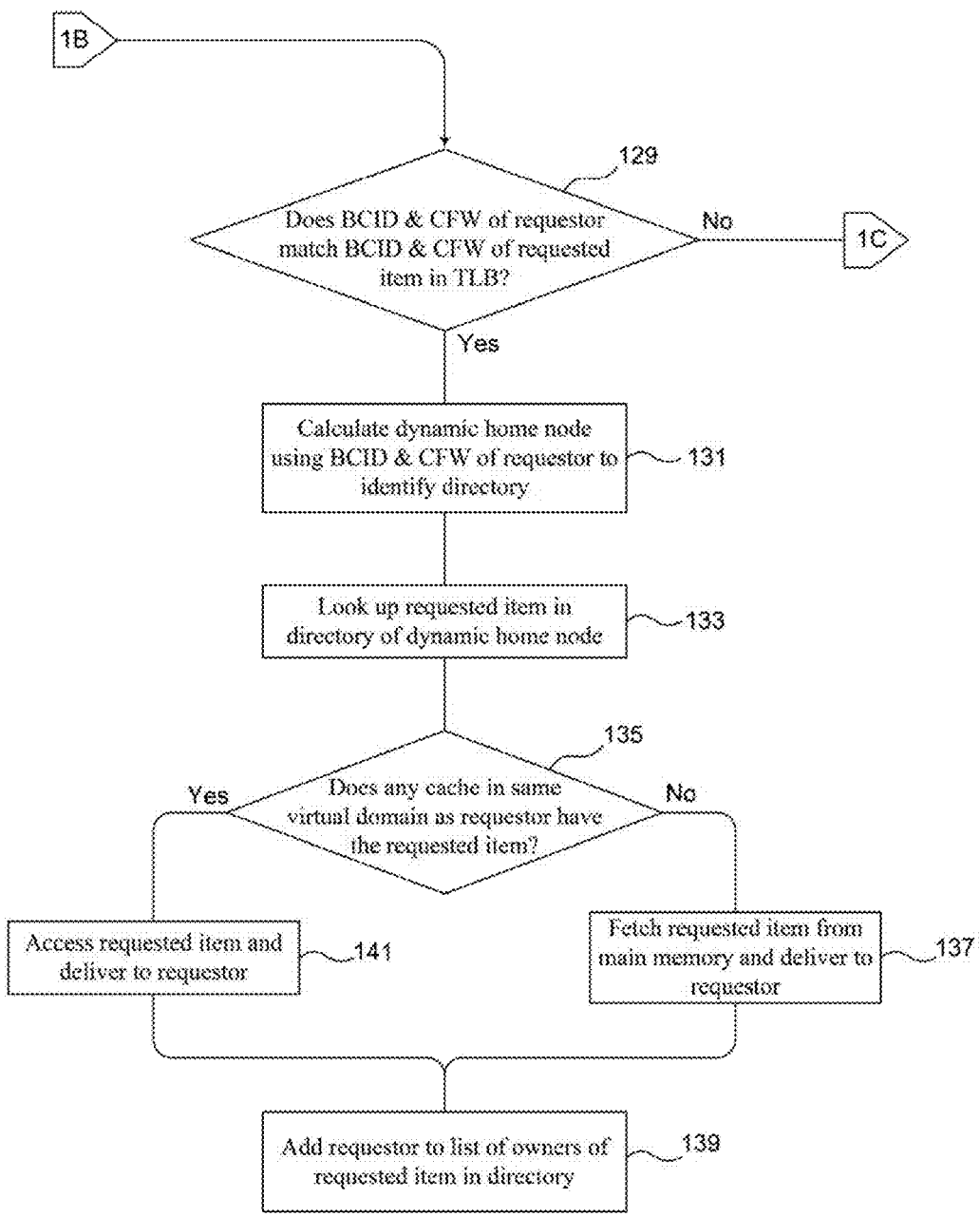
Figure 1C:
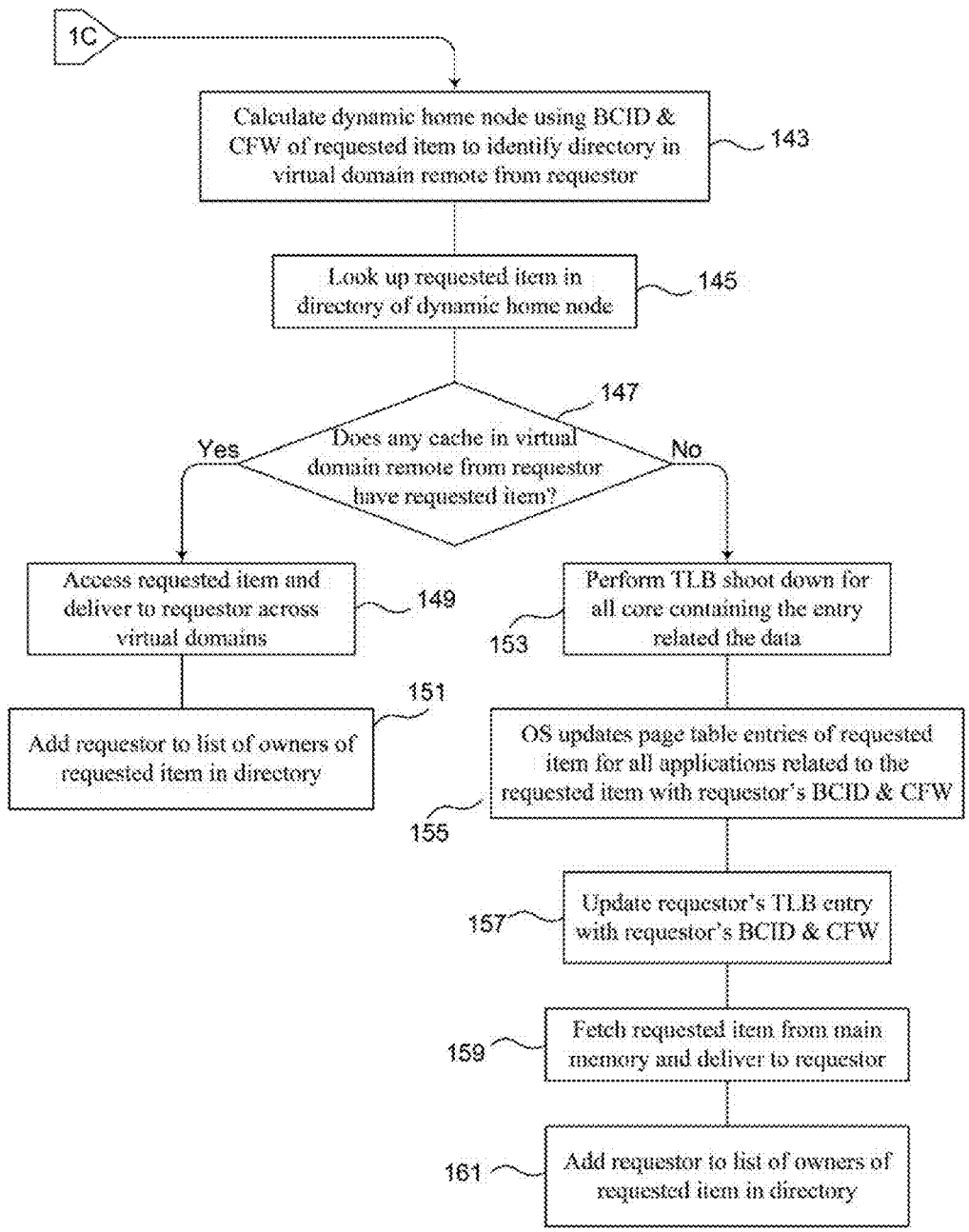

FIGS. 1A, 1B and 1C depict a method of managing a chip multi-processor (CMP) through virtual domains. Managing a CMP through reconfigurable virtual domains to localize and reduce on-chip traffic, while allowing easy data sharing across domain boundaries, is described herein. Tiles of a CMP are grouped into a plurality of virtual domains (101). A mapping (generally 103) unique to each virtual domain is stored in the tiles grouped in that virtual domain. In some embodiments the mapping comprises a base core identification word (BCID) (105) and a configuration word (CFW) (107), to be described in more detail presently. With this mapping, a request from any tile in a virtual domain for an item of data need not go outside that virtual domain for directory information or for the requested item, if the requested item is stored anywhere within that virtual domain.

An operating system (OS) sets up page tables for mapping between virtual addresses and physical addresses for applications before launching them. The page table structure is extended with two additional fields reserved for BCIDs and CFWs. Prior to the first time a given item of data indexed by the page table is accessed, these two additional fields will be empty. When setting up memory space for different software applications in the system, the OS makes sure that the page tables of shared memory blocks of all applications are linked together. In some embodiments the OS includes an entry for a memory page that is not domain-specific; an example of such a page is an OS page. For these pages BCID and CFW are calculated using their page address.

A physical address of an item of data requested by an application running in a given tile (the "requesting tile") is obtained by using the item's virtual address to look up the item in the TLB (109). If a TLB miss occurs ("miss" means the item is not found), the item will be looked up in the page table and if the item has not been loaded into the physical memory, a "page fault" is said to have occurred (111). On the very first request to access an item, the requesting tile will encounter both a TLB miss and a page fault. When this happens, the OS will look up the BCID and CFW entries in the page table (113). If the BUD and CFW fields in the page table entry are empty, the OS confirms this is the first access of the item. The OS then enters the BCID and CFW of the requesting tile in the page table entry (115). In some embodiments, if the page is shared by multiple applications the OS updates page table entries of the requested item for all applications related to the requested item with the requesting tile's BCID and CFW (117), and in other embodiments this procedure is avoided by marking shared pages as not domain-specific. A data page for the requested item is brought from hard disk to main memory (119). Since the TLB entry is filled with the page table entry (the TLB being a special cache of the page table), it is possible that the page table is updated by the OS, already using a BCID and CFW of other tiles. Accordingly the comparison in block 129, to be discussed presently, must be made at this point. When the OS swaps a page out from the currently running process, the OS must invalidate the TLB and page table entries for applications that share the memory page.

The page table entry, including the additional fields of BCID and CFW, is also entered in the TLB corresponding with the requesting tile (121). If a TLB miss does not lead to a page fault (111), the OS (or in some embodiments a hardware memory management unit) enters the page table entry including the BCID and CFW fields in the TLB as the new BCID and CFW of the requested item (121).

Either after the TLB is refilled as in block 121, or if a TLB hit happens during the physical address to virtual address translation as in block 109, the requestor compares the BCID and CFW registers of the requesting tile with the BCID and CFW stored in the current TLB entry (129 in FIG. 1B). If the two match, base core ID and configuration word fields in requestor tile are used to compute dynamic home node (131). At the dynamic home node, the directory will be looked up (133). If no tile has the item (135), the item is copied from the main memory into a cache of the requestor tile (137), and directory records the tile as the current owner of the item (139). If the directory indicates another tile(s) has the item, the item is fetched from the owner to the requestor core (141). And the directory adds the requestor to the owner list of the item (139). Note that the owner and requestor are in the same domain in this case. There may be more than one owner of an item, and such owners may be referred to as "sharers".

A mismatch between the BCID and CFW fields in the requestor tile and those in the TLB entry indicates the page is actively shared by multiple domains, and a tile in a remote domain is serving as the dynamic home node. Thus, BCID and CFW fields in the TLB entry are used to compute the dynamic home node (143 in FIG. 1C). At the dynamic home node, the directory will be looked up (145). If the directory indicates some tile(s) has the item (147), the item is fetched from the owner and sent to the requestor outside the current domain (149). Note that the owner(s) and requestor are in different domains in this case. Then the requestor is added to the directory as an owner of the requested item (151).

If the directory indicates that no tile has the item in the current domain, the dynamic home node will migrate from the remote domain to the domain where the requestor resides. In order to do this, the CMP will perform a TLB shoot down operation to invalidate all TLB entries with the virtual address of the requested data item (153). The OS updates the page table entries of the requested item for all applications related to the requested item with the requesting tile's BCID and CFW fields (155). At this point, only the page table entries are updated, since TLB entries have been invalidated, and on the next request for the item a TLB miss will occur. The TLB entry of the requestor is filled by the updated page table entry (157). The updates of the BCID and CFW fields and TLB shoot down operation transfer the dynamic home node of the item from remote domain to the domain where the requestor resides. Then, the item is copied from the main memory into a cache of the requestor tile (159), and the directory is updated to show the requesting tile as the current owner of the item (161).

The foregoing discussion pertains to tiles with private last level caches and aggregated shared last level caches. Base on the different cache types and the relations between higher level and lower level caches (e.g. inclusive, exclusive, or hybrid), there might be a slight different on the location of the owner/sharer tiles inside a domain. A more sophisticated cache coherence protocol may also be used if desired.

In some embodiments each tile has a BCID register and a CFW register. Storing a BCID and CFW in such a tile comprises entering the BCID into the BCID register and entering the CFW into the CFW register. The BCID identifies that virtual domain into which the tile has been grouped, and the CFW gives additional information about that virtual domain, as will be discussed presently.

Figure 2:
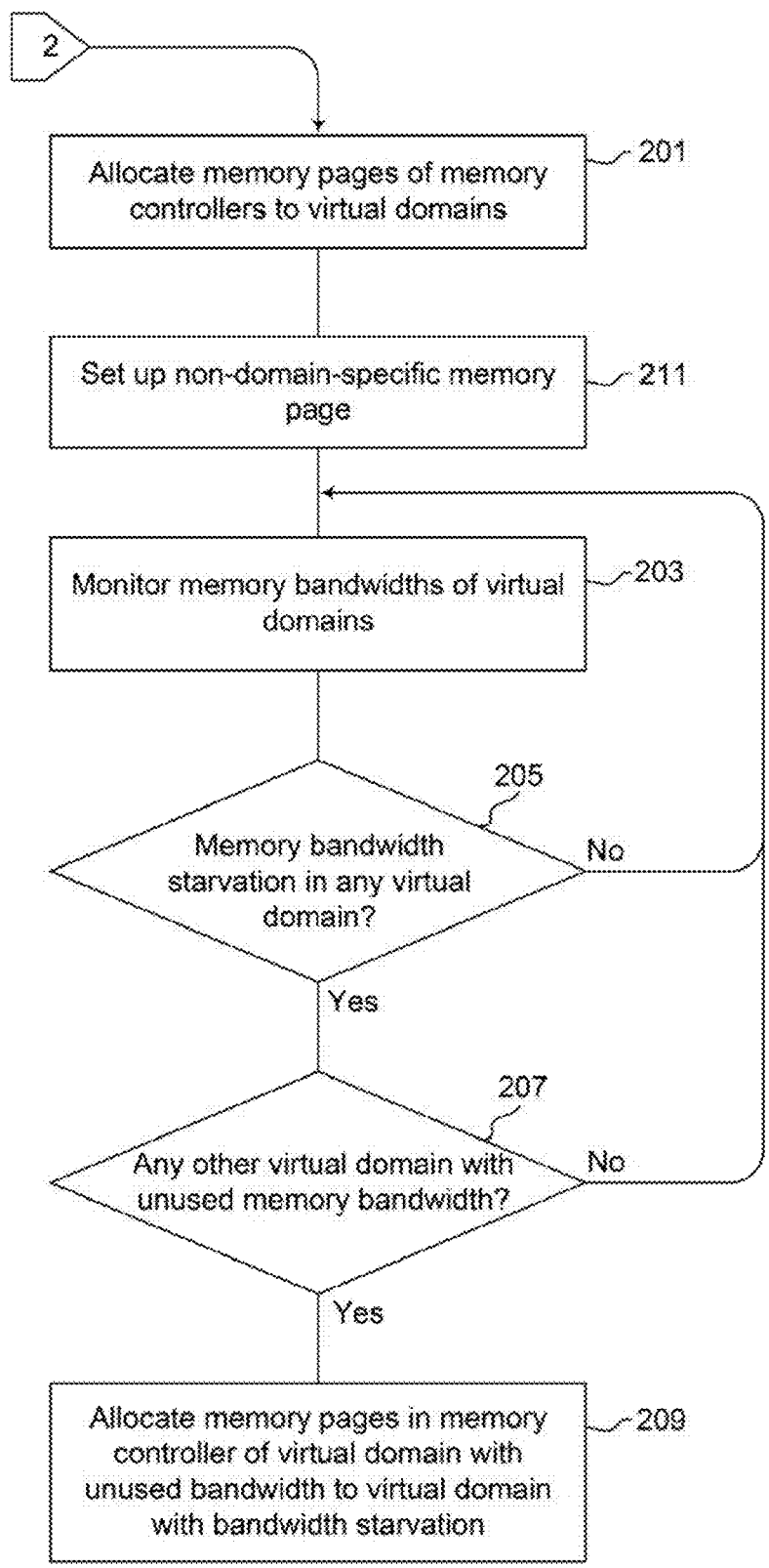
FIG. 2 is a flowchart illustrating an example of a memory bandwidth management aspect of the method of FIG. 1.

As shown in FIG. 2, in some embodiments memory pages of the memory controllers are allocated to the virtual domains (201) and memory bandwidths of the virtual domains are monitored (203). If the monitoring shows memory bandwidth starvation in one of the virtual domains (205), and if there is another virtual domain with unused memory bandwidth (207), memory pages are re-allocated from the second virtual domain to the first (209).

Figure 3:
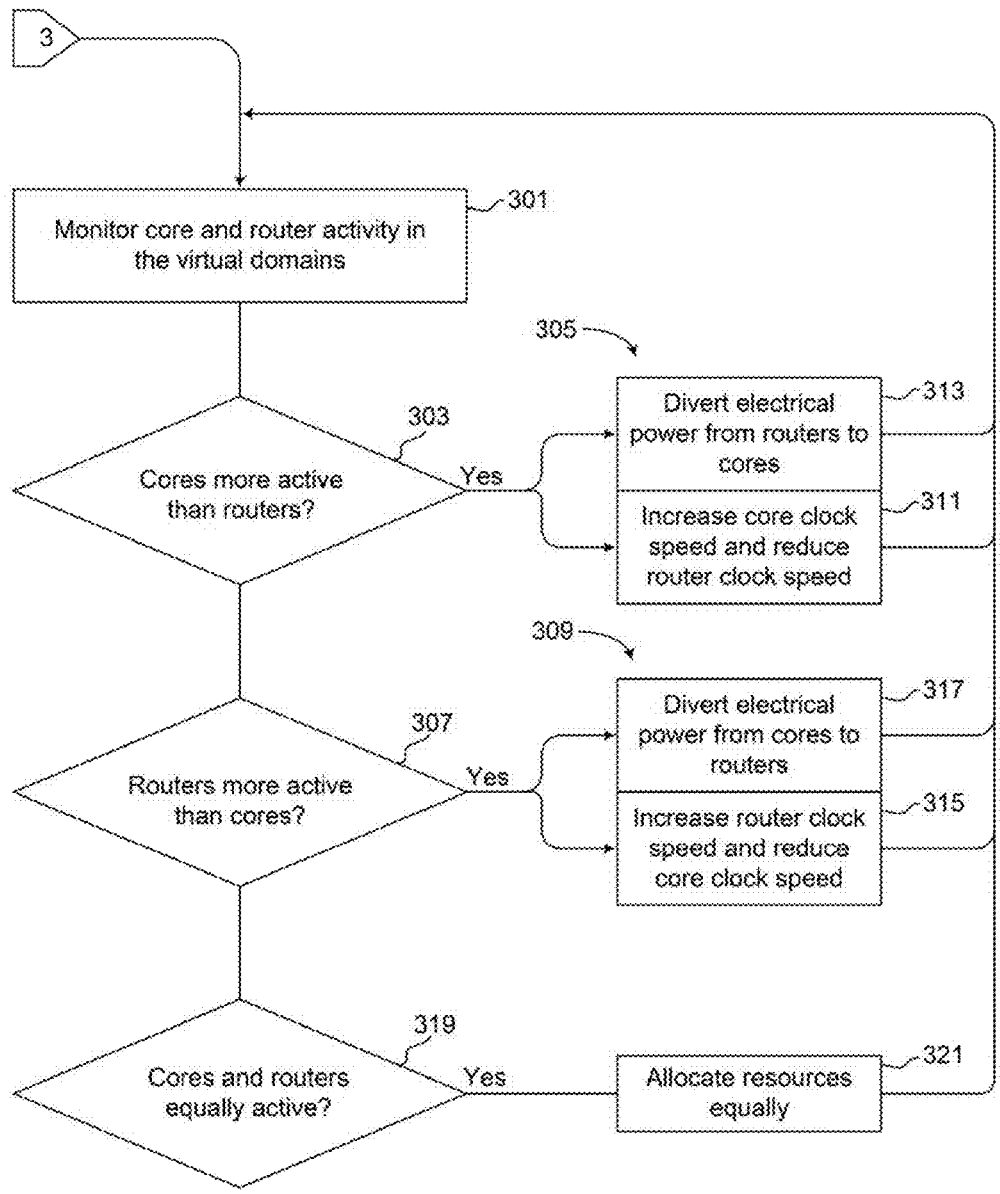
FIG. 3 is a flowchart illustrating an example of a resource management aspect of the method of FIG. 1.

In some embodiments core and router activity in the tiles in the virtual domain are monitored (301), as shown in FIG. 3. If the cores in a virtual domain are more active than the routers in that virtual domain (303), resources are diverted from the routers to the cores (305). If the routers in a virtual domain are more active than the cores in that virtual domain (307), resources are diverted from the cores to the routers (309). For example, resources may be diverted from routers to cores by increasing the clock frequency of the cores and reducing that of the routers (311), or by increasing the voltage of the power supply to the cores and reducing that to the routers (313). Similarly, resources may be diverted from cores to routers by increasing the clock frequency of the routers and reducing that of the cores (315), or by increasing the voltage of the power supply to the routers and reducing that to the cores (317). If the cores and routers have about equal activity (319) then resources may be allocated equally (321).

Figure 4:
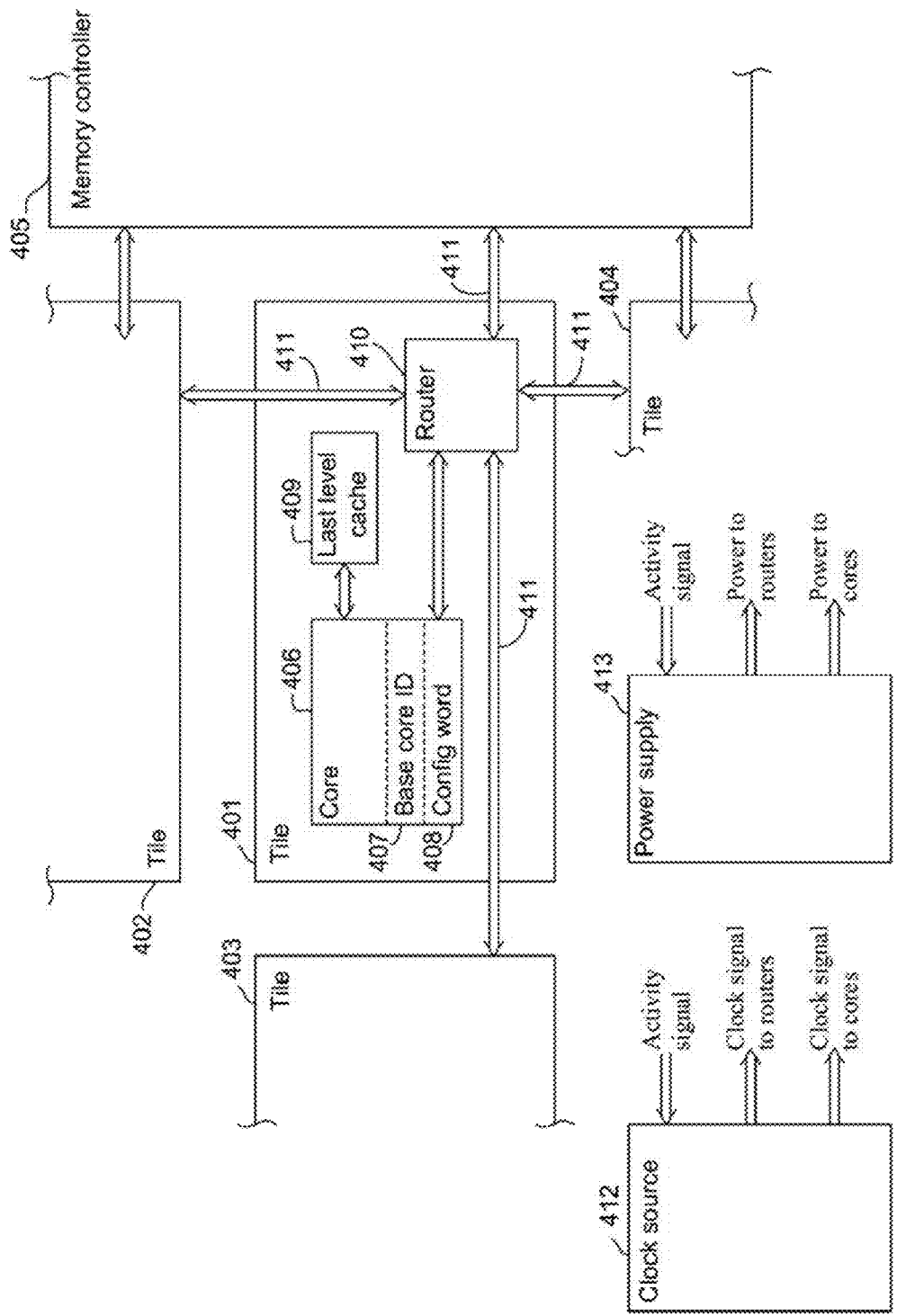
FIG. 4 is a block diagram of an example of a portion of a CMP having virtual domain management.

FIG. 4 shows a CMP with virtual domain management. The components of the CMP include a plurality of tiles such as the tiles 401, 402, 403, and 404, and a plurality of memory controllers such as the memory controller 405, formed in an integrated circuit. Each tile, for example the tile 401, includes a core 406, a BCID register 407 in the core, a CFW register 408 in the core, a cache 409, and a router 410. A communication bus 411 interconnects the routers with each other and with the memory controllers.

Computer instructions may be in the form of object code or any other suitable form for performing the functions described as follows.

The cores are responsive to the instructions to group the tiles into a plurality of virtual domains, each memory controller associated with one or more of the virtual domains, to store a BCID associated with a virtual domain in the BCID registers of the cores in that virtual domain, and to store a CFW descriptive of that virtual domain in the CFW registers of the cores in that virtual domain.

The cores are responsive to the instructions to obtain a physical address of an item of data requested by an application running on at least one tile in that virtual domain and to carry out a procedure similar to that described above to provide the requested item to the requesting application.

In some embodiments the physical address of an item of data comprises an address in a memory remote from the CMP itself, as will be discussed presently in connection with another embodiment.

Some embodiments include an operating system (OS) in one or more of the caches. The OS may consider the entire chip to be a single domain, with the result that only one BCID and CFW may be used. Or the OS may use the BCIDs and CFWs stored in the tile registers. The OS may include a memory management unit to maintain the page table or a cache coherence protocol to maintain coherence between the caches and a remote memory and between one cache and another, or both.

Some embodiments include a plurality of clock sources such as the clock source 412 or a plurality of power supplies such as the power supply 413, or both. Each clock source has a router clock signal connection to at least one router and a core clock signal connection to at least one core. The clock source is responsive to an activity signal indicative of relative activity levels of the router and the core to increase and decrease frequencies of the clock signals according to the relative activity levels. Each power supply has an electrical power connection to at least one router and an electrical power connection to at least one core. The power supply is responsive to an activity signal indicative of relative activity levels of the router and the core to increase and decrease the router and core power according to the relative activity levels. For example, if the activity of the routers in a virtual domain increases, overall processing speed of the tiles in that domain may be improved by increasing the clock speed of the routers while decreasing that of the cores, or by diverting more electrical power to the routers, or both.

Figure 5:
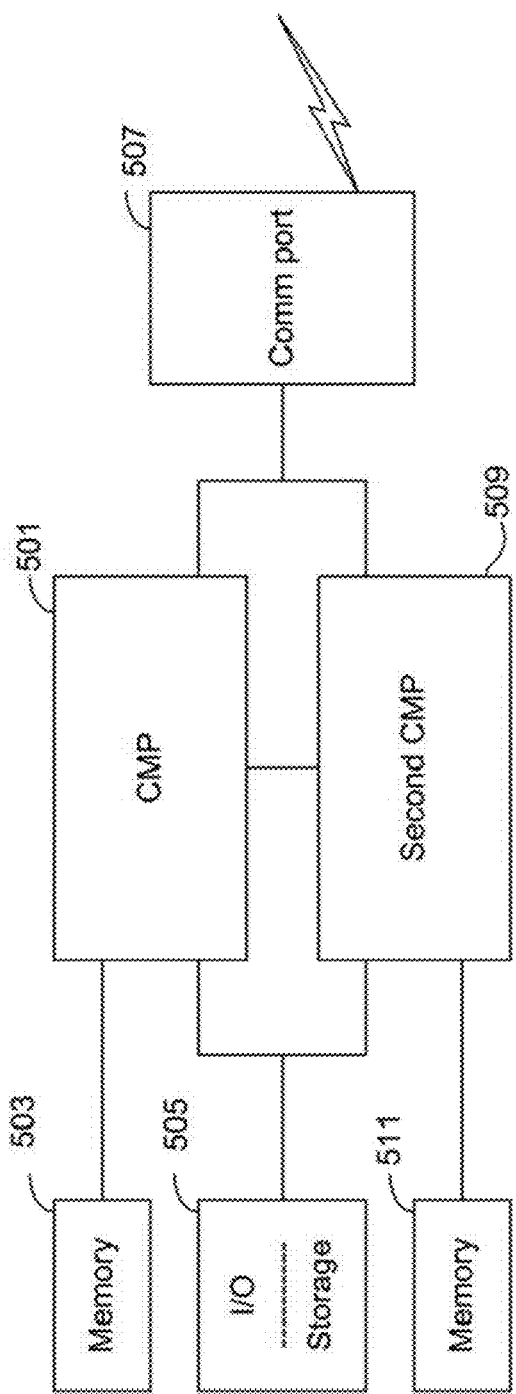
FIG. 5 is a block diagram of an example of a computer system including CMPs having virtual domain management.

FIG. 5 illustrates a chip multi-processor system with virtual domain processor management according to an embodiment. The system includes a first chip multi-processor 501 generally similar to the one described with reference FIG. 4 and memory 503. Some embodiments may also include an input/output and storage unit 505 and a communication port 507. The system may include, either in the storage or in system memory, an operating system as described above. The system may include more than one CMP and memory. A second CMP 509 and memory 511 are shown, but the system may include only one CMP or several.

Some embodiments include one or both of a clock source 511 and a power supply 513, similar to the clock source 412 and power supply 413 of FIG. 4, that can allocate power and clock speed selectively to routers and cores according to activity levels.

Figure 6:
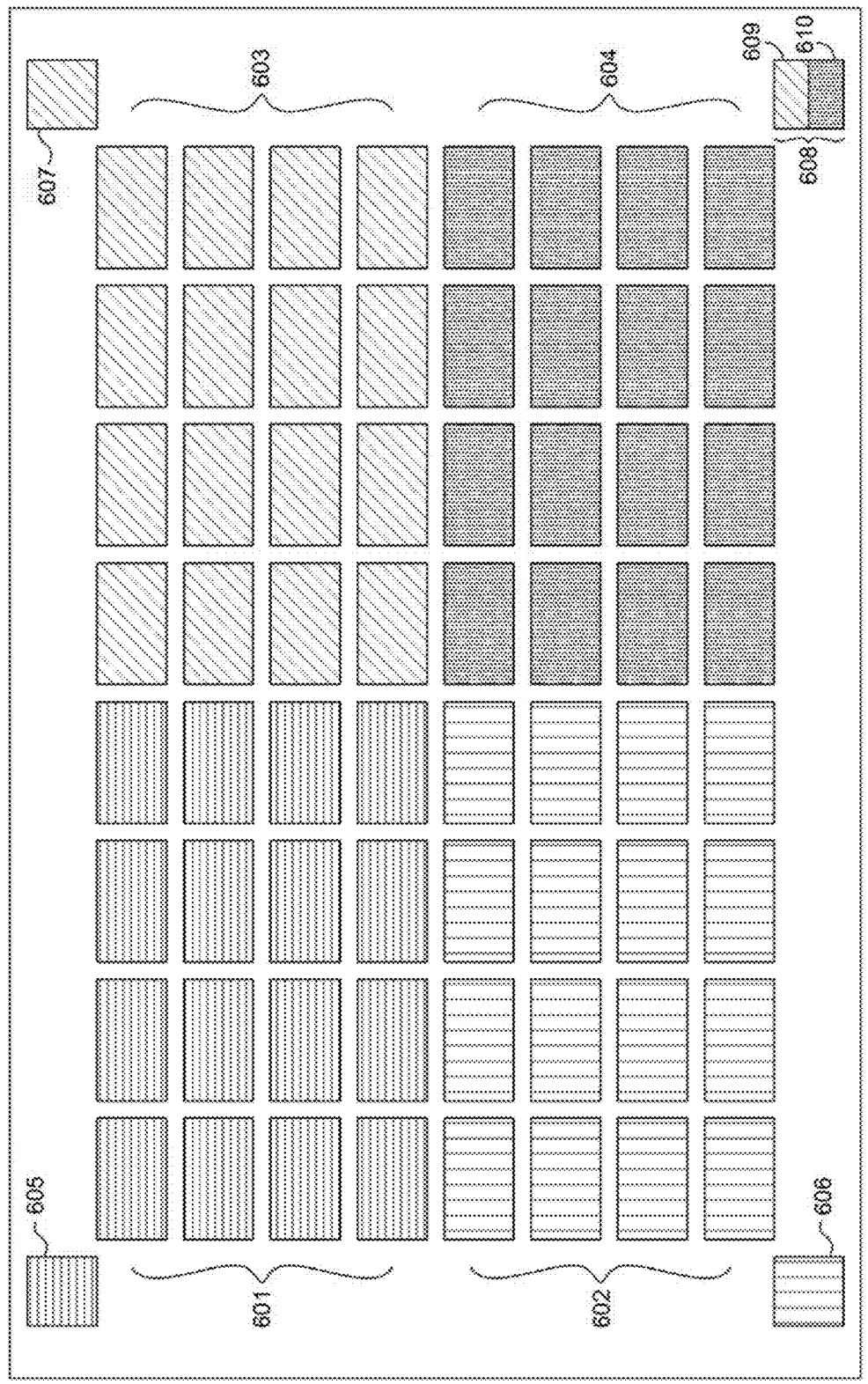
FIG. 6 is a block diagram of an example of a CMP showing tiles assigned to virtual domains.

FIG. 6 shows a CMP generally 600. This CMP includes 64 tiles that have been grouped into four virtual domains 601, 602, 603, and 604, each domain having 16 tiles. In other embodiments some virtual domains may have more tiles than others, and there may be some other number of tiles than 64 in one CMP.

In some embodiments, when pages of the memory controllers are allocated to the virtual domains, memory bandwidths of the virtual domains are monitored. If this monitoring shows memory bandwidth starvation in a first one of the virtual domains, a determination is made whether there is a second one of the virtual domains with unused memory bandwidth. If there is unused memory bandwidth in a second domain, pages of that memory controller which has pages allocated to the second domain are re-allocated to the first domain.

For example, in FIG. 6 memory pages of a memory controller 605 are used by the virtual domain 601, memory pages of a memory controller 606 are used by the virtual domain 602, memory pages of a memory controller 607 are used by the virtual domain 603, and memory pages of a memory controller 608 are used by the virtual domain 604. However, it has been determined that the virtual domain 603 needs more memory pages and that the virtual domain 604 can spare some of its memory pages, so a portion 609 of the memory pages of the memory controller 608 have been reallocated to the virtual domain 603, and the virtual domain 604 now has only a portion 610 of the memory pages of the memory controller 608.

The monitoring of memory bandwidth and the allocation of pages may be carried out by the operating system running on one or more of the tiles as will be discussed in more detail presently.

One tile in each domain is designated as the base. The location of that tile defines the BCID. The address of any other tile in that domain is expressed relative to the base address. The CFW for a given virtual domain has four numbers:

the number of rows in the CMP
the number of columns in the CMP
the number of rows in the domain
the number of columns in the domain All the tiles in a virtual domain have the same configuration word.

The dynamic home node of a directory in a virtual domain is calculated from the BCID, the CFW, and a requested memory location (physical memory address) according to the following equation:

$$H = B + [(P/C_D) \bmod R] * C_C + P \bmod C_D$$

where
B=BCID
$C_C$=number of columns on CMP
$C_D$=number of columns in virtual domain
H=dynamic home node
P=physical memory address
R=# of rows in virtual domain
mod=remainder, e.g., x mod y=remainder of x/y In some embodiments the dynamic home node is also found through a lookup table that keeps track of this information for all the pages.

Memory allocation—that is, memory controller partitioning—as discussed above and shown in FIG. 6 may be accomplished by the OS. When setting up a page table of a process or workload, the OS will only allocate physical pages from a nearby memory controller if there is no page sharing. This is beneficial when the memory controllers can provide enough bandwidth to the local domain since locality can be exploited when accessing memory controllers. But the OS also monitors the memory bandwidth usage of each domain in order to prevent memory bandwidth starvation. When an OS detects memory bandwidth starvation (saturation on local memory bandwidth and performance degeneration on the local domain), the OS will allocate new physical pages associated with remote controllers. The OS will also set up page tables for shared pages by mapping them to the same memory controller. As shown in FIG. 2, in some embodiments the OS sets up pages, such as OS pages, that are not domain-specific (211); that is, pages having a dynamic home node that is the same as the static home node of that page. A static home node can be determined by the above same equation for computing dynamic home node, while assuming that the CMP contains a single domain with all tiles inside. This static home node does not change during the whole life of the data pages.

Applications running on one or more tiles often have different phases such as a communication-intensive phase when the router is very active and the core is relatively inactive and a computation-intensive phase when the core is very active but the router is little used. Shifting power to the more active part, for example by increasing the clock frequency or supply voltage or both, during different phases can make better use of the available power and achieve better performance. Performing power-shifting over the entire chip may have a negative overall impact since a CMP typically has multiple applications running at the same time. These applications may not be in the same phase at the same time—that is, some may be in a communication-intensive phase while others are in a computation-intensive phase. Thus, power shifting between cores and routers on a whole-CMP basis may degrade the performance of some applications even while improving the performance of others.

With the CMP partitioned into multiple virtual domains, smart power management can be used to achieve better performance with the same power budget. Inside each virtual domain, the clock frequency and supply voltage of the cores and the routers can be adjusted on the fly individually. Power-shifting is performed within each domain according to the phase of an application running in that domain. In this way, the power shifting is performed efficiently without interference among different domains and applications.

Diversion of resources as discussed above may be done whenever there is insufficient power available to run all components at maximum. This may be the case, for example, in a battery-powered system, or any time energy conservation is a factor. Cores and on-chip networks (routers) are two major power-hungry parts of the tiles. Distributing total power usage efficiently over these two parts can significantly increase performance per watt.

Managing processors through virtual domains in CMPs according to the foregoing principles makes it possible to service most on-chip traffic within a virtual domain, minimizing message travel to more distant locations. Interference among separate domains is minimized. Power consumption is reduced because there are fewer coherence operations and fewer accesses to memory controllers. Virtual domains are dynamically reassigned to better align core and memory resources with current needs and balance memory bandwidth for each domain to prevent memory bandwidth starvation. DRAM capacity of up to 12 percent may be saved by reducing the storage of directory information. Caches in tiles that are in sleep mode can be accessed through dynamic home addresses. Server consolidation is supported. Performance isolation and content-based page sharing among virtual machines are also supported because inter-domain coherent messaging is minimized while still allowing cross-domain page-sharing.

We claim:

1. A chip multi-processor with virtual domain management comprising:
    a plurality of tiles formed in an integrated circuit, each tile comprising a core and a cache;
    a mapping storage;
    a plurality of memory controllers formed in the integrated circuit;
    a communication bus interconnecting the tiles and the memory controllers; and
    machine-executable instructions, the tiles and memory controllers responsive to the instructions to:
        group the tiles into a plurality of virtual domains, each virtual domain associated with at least one memory controller and including a dynamic home tile storing a directory, each virtual domain permitting each tile of the tiles within the virtual domain to access data stored in the cache of any other tile of the tiles of the virtual domain without having to employ directory hardware global to the tiles of the chip multi-processor by referencing the directory of the dynamic home tile of the virtual domain; and
        store a mapping unique to each virtual domain in the mapping storage,
    wherein when a requesting tile of a current domain requests a data item, the dynamic home tile for the data item is determined, and if no tile of the current domain has the data item, the dynamic home tile for the data item is migrated from a different domain to the current domain.

2. The chip multi-processor of claim 1 wherein the mapping storage comprises a base core identifier word (BCID) register and a configuration word (CFW) register in each tile.

3. The chip multi-processor of claim 1 and further comprising:
    a router in each tile;
    a plurality of clock sources each connected to provide a router clock signal to at least one router and a core clock signal to at least one core, each clock source responsive to an activity signal indicative of relative activity levels of the at least one router and at least one core to increase and decrease frequencies of the router and core clock signals according to the relative activity levels; and
    a plurality of power supplies each connected to provide electrical power to at least one router and at least one core, each power supply responsive to an activity signal indicative of relative activity levels of the at least one router and at least one core to increase and decrease the power provided to the at least one router and at least one core according to the relative activity levels.

4. A chip multi-processor with virtual domain management comprising:
    a plurality of tiles formed in an integrated circuit, each tile comprising:
        a core,
        a cache, and
        mapping storage;
    a plurality of memory controllers formed in the integrated circuit;
    a communication bus interconnecting the tiles and the memory controllers; and
    machine-executable instructions, the tiles and memory controllers responsive to the instructions to:

group the tiles into a plurality of virtual domains, each virtual domain associated with at least one of the memory controllers and including a dynamic home tile storing a directory, each virtual domain permitting each tile of the tiles within the virtual domain to access data stored in the cache of any other tile of the tiles of the virtual domain without having to employ directory hardware global to the tiles of the chip multi-processor by referencing the directory of the dynamic home tile of the virtual domain; and store a mapping unique to each virtual domain in the mapping storage of the tiles in that virtual domain, wherein when a requesting tile of a current domain requests a data item, the dynamic home tile for the data item is determined, and if no tile of the current domain has the data item, the dynamic home tile for the data item is migrated from a different domain to the current domain.

5. The chip multi-processor of claim 4 wherein the mapping storage in each tile comprises a base core identifier word (BCID) register and a configuration word (CFW) register.

6. The chip multi-processor of claim 5 wherein the machine instructions provide a page table having a plurality of entries, each entry comprising:
    a cross-reference between a virtual data item address and a physical data item address;
    a BCID field; and
    a CFW field.

7. The chip multi-processor of claim 6 wherein, responsive to a data item request from an application running in a tile in a virtual domain, the machine instructions provide:
    a look-up of the physical address of the requested item in a translation lookaside buffer (TLB),
    if the requested item is found in the TLB, a comparison of the BCID and CFW of the tile from which the request originated with the BCID and CFW of the requested item in the TLB;
    if the comparison indicates a match, a calculation of a dynamic home node to identify a directory that indicates which cache in that virtual domain contains the item and an access of the requested item; and
    if the comparison does not indicate a match, a calculation of a dynamic home node using the BCID and CFW of the requested item to identify a directory in a remote virtual domain that indicates which cache in the remote virtual domain contains the item, an access of the requested item, and delivery of the requested item across domains to the requesting application.

8. The chip multi-processor of claim 7 wherein, if the requested item is not found in the TLB, the machine instructions provide:
    a check for a page fault;
    if a page fault does not occur, placement of the page table entry of the requested item together with the BCID and CFW in the TLB; and
    if a page fault occurs, if there is no page table entry containing a BCID and CFW of the requested item, entry into the page table of the BCID and CFW of the tile from which the request originated; an update of page table entries of the requested item for any applications related to the requested item if the page is shared by more than one application; and a fetch of the requested item from storage; and if the page table has an entry containing the BCID and CFW of the requested item, a fetch of the requested item from storage.

9. The chip multi-processor of claim 6 wherein the page table includes an entry for a memory page having a dynamic home node that is the same as a static home node for that page.

10. The chip multi-processor of claim 4 wherein the machine instructions provide:
    monitoring of memory bandwidths of the virtual domains; and
    if the monitoring shows memory bandwidth starvation in a first one of the virtual domains, a determination of whether there is a second one of the virtual domains with unused memory bandwidth, and
    if so, a re-allocation of at least one memory page in the memory controllers from the second virtual domain to the first.

11. The chip multi-processor of claim 4 and further comprising:
    a router in each tile;
    a plurality of clock sources each connected to provide a router clock signal to at least one router and a core clock signal to at least one core, each clock source responsive to an activity signal indicative of relative activity levels of the at least one router and at least one core to increase and decrease frequencies of the router and core clock signals according to the relative activity levels; and
    a plurality of power supplies each connected to provide electrical power to at least one router and at least one core, each power supply responsive to an activity signal indicative of relative activity levels of the at least one router and at least one core to increase and decrease the power provided to the at least one router and at least one core according to the relative activity levels.

12. A method of managing a chip multi-processor (CMP) through virtual domains, the CMP having a plurality of tiles and a plurality of memory controllers, the method comprising:
    grouping the tiles into a plurality of virtual domains, each virtual domain including a dynamic home tile storing a directory and permitting each tile of the tiles within the virtual domain to access data stored in the cache of any other tile of the tiles of the virtual domain without having to employ directory hardware global to the tiles of the CMP by referencing the directory of the dynamic home tile of the virtual domain; and
    storing a mapping that identifies one of the virtual domains and a location of one of the tiles in that virtual domain in a mapping storage in that tile,
    wherein when a requesting tile of a current domain requests a data item, the dynamic home tile for the data item is determined, and if no tile of the current domain has the data item, the dynamic home tile for the data item is migrated from a different domain to the current domain.

13. The method of claim 12 wherein storing a mapping in a mapping storage in a tile comprises storing a base core identifier word (BCID) in a BCID register in the tile and storing a configuration word (CFW) in a CFW register in the tile.

14. The method of claim 13 and further comprising, responsive to a data item request from an application running in a tile in a virtual domain:
    seeking the physical address of the requested item in a translation lookaside buffer (TLB);
    if the requested item is found, comparing the BCID and CFW of the tile from which the request originated with the BCID and CFW of the requested item;

if the comparison indicates a match, calculating a dynamic home node to identify a directory that indicates which cache in that virtual domain contains the item and accessing the item; and if the comparison does not indicate a match, calculating a dynamic home node using the BCID and CFW of the requested item to identify a directory in a remote virtual domain that indicates which cache in the remote virtual domain contains the item, accessing the item, and sending the requested item across domains to the requesting application.

15. The method of claim 14 and further comprising, if the requested item is not found in the TLB:

checking for a page fault;

in the absence of a page fault, copying a page table entry of the requested item and the BCID and CFW of the tile from the page table entry into the TLB; and if a page fault is found, if there is no page table entry containing a BCID and CFW of the requested item, entering the BCID and CFW of the tile from which the request originated into the page table; updating page table entries of the requested item for any applications related to the requested item if the page is shared by more than one application; and bringing the requested item from storage into memory.

16. The method of claim 12 and further comprising monitoring memory bandwidths of the virtual domains; and if the monitoring shows lack of adequate memory bandwidth in a virtual domain, reassigning a memory page in a memory controller from a virtual domain not having a lack of memory bandwidth to the virtual domain lacking adequate memory bandwidth.

17. The method of claim 12 and further comprising:

monitoring core and router activity in the tiles in the virtual domains;

if cores in a virtual domain are more active than routers in that virtual domain, diverting resources from the routers to the cores; and if the routers in that virtual domain are more active than the cores in that virtual domain, diverting resources from the cores to the routers.

18. The method of claim 17 wherein:

diverting resources from routers to cores comprises at least one of increasing a clock frequency of the cores and reducing that of the routers and increasing a voltage of the power supply to the cores and reducing that to the routers; and diverting resources from cores to routers comprises at least one of increasing a clock frequency of the routers and reducing that of the cores and increasing a voltage of the power supply to the routers and reducing that to the cores.

19. The chip multi-processor of claim 1, wherein each tile within each virtual domain is to access data stored in the cache of any tile of a different virtual domain by determining the dynamic home tile of the different virtual domain without having to access information outside of the virtual domain of the tile and then by referencing the directory of the dynamic home tile of the different virtual domain that has been determined.

* * * * *